(12) United States Patent
Yamaguchi et al.

(10) Patent No.: US 9,935,509 B2
(45) Date of Patent: Apr. 3, 2018

(54) ROTARY ELECTRIC MACHINE ROTOR (71) Applicant: HONDA MOTOR CO., LTD., Tokyo (JP)

(72) Inventors: Tadashi Yamaguchi, Wako (JP); Masashi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 192 days.

(21) Appl. No.: 15/068,644

(22) Filed: Mar. 14, 2016

(65) Prior Publication Data
US 2016/0301269 A1 Oct. 13, 2016

(30) Foreign Application Priority Data

Apr. 13, 2015 (JP) ................................. 2015-081532

(51) Int. Cl.
*H02K 21/12* (2006.01)
*H02K 1/27* (2006.01)

(52) U.S. Cl.
CPC ....... *H02K 1/2766* (2013.01); *H02K 2213/03* (2013.01)

(58) Field of Classification Search
CPC ... H02K 1/276; H02K 1/2766; H02K 2213/03
USPC ............. 310/156.38, 156.53, 153.56, 156.57
See application file for complete search history.

(56) References Cited

U.S. PATENT DOCUMENTS

| 2006/0103253 A1* | 5/2006 | Shiga | H02K 1/2786 310/156.45 |
|---|---|---|---|
| 2006/0186752 A1* | 8/2006 | Matsumoto | H02K 1/276 310/156.53 |
| 2009/0174273 A1* | 7/2009 | Watanabe | H02K 15/03 310/156.53 |
| 2009/0289517 A1* | 11/2009 | Jockel | H02K 1/276 310/156.53 |
| 2014/0217849 A1* | 8/2014 | Soma | H02K 1/276 310/156.53 |
| 2014/0232232 A1* | 8/2014 | Yamaguchi | H02K 1/2766 310/156.53 |
| 2014/0375165 A1* | 12/2014 | Masubuchi | H02K 15/03 310/156.53 |

FOREIGN PATENT DOCUMENTS

| JP | 2013-251930 | 12/2013 |
|---|---|---|
| JP | 2014-165938 | 9/2014 |

* cited by examiner

*Primary Examiner* — Thanh Lam
(74) *Attorney, Agent, or Firm* — Mori & Ward, LLP (57) ABSTRACT

A rotor core has a rotational axis. A permanent magnet has a polygonal shape viewed along the rotational axis. The rotor core includes a magnet insertion hole defined by an inner wall. The polygonal shape includes first to third sides. The magnet insertion hole includes: a first space provided between the first side and the inner wall; a second space provided between the second side and the inner wall; and an injection portion, a first communication portion, and a second communication portion provided between the third side and the inner wall; viewed along the rotational axis. The first communication portion and the second communication portion connect the injection portion to the first space and the second space, respectively. The first communication portion has a first length along the third side. The second communication portion has a second length along the third side which is equal to the first length.

12 Claims, 4 Drawing Sheets

ROTARY ELECTRIC MACHINE ROTOR

CROSS-RECURRENCE TO RELATED APPLICATIONS

The present application claims priority under 35 U.S.C. § 119 to Japanese Patent Application No. 2015-081532, filed Apr. 13, 2015, entitled "Rotary Electric Machine Rotor." The contents of this application are incorporated herein by reference in their entirety.

BACKGROUND

Field of the Invention

The present disclosure relates to a rotary electric machine rotor.

Discussion of the Background

A rotary electric machine typically includes a rotor having a plurality of permanent magnets provided on an inner circumferential side of a stator disposed in an annular shape. The rotor turns when wires wound around the stator are energized.

The rotor typically includes a rotor core in which the permanent magnets are secured in a plurality of magnet insertion holes with a resin material. Using a resin material, each of the permanent magnets is secured closer to an outer circumferential side or an inner circumferential side of an inner wall surface that defines the magnet insertion holes.

In the configuration described above, the permanent magnets may be inclined before being secured in the magnet insertion holes, which does not generate a desired output and thus causes a problem of degraded motor efficiency. To solve the problem, there is known a laminated core manufacturing process disclosed in, for example, Japanese Unexamined Patent Application Publication No. 2013-251930.

In such a manufacturing process, most of a resin injected into the magnet insertion holes flows into a resin reservoir provided on a side opposite to a side in the magnet insertion hole, which the permanent magnet is leaned closer to, thereby the permanent magnet is pressed against and secured to the side which the permanent magnet is leaned toward. In addition, the permanent magnet is held vertically by a magnet retaining portion whereby the permanent magnet is secured without being inclined.

Japanese Unexamined Patent Application Publication No. 2014-165938 discloses a rotary electric machine that achieves a high output while preventing a short circuit of magnetic flux among adjacent magnets. Such a rotary electric machine has a first storage hole and a pair of second storage holes provided in the vicinity of an outer circumference of a rotor thereof. A first rib is formed between the first storage hole and the pair of second storage holes, while a pair of second ribs are formed between the second storage holes and an outer circumferential surface of the rotor. In addition, an area of a first space provided between the first rib and a magnet is configured to be greater than an area of a second space provided between the second ribs and the magnet.

SUMMARY

According to one aspect of the present application, a rotary electric machine rotor includes a rotor core having rectangular permanent magnets secured in magnet insertion holes with a bonding component. The rotor includes a first space and a second space are provided around each of the permanent magnets so as to be located between both ends in a longer-side direction of the permanent magnet and an inner wall surface defining each of the magnet insertion holes. An injection portion through which each of the bonding components is injected, a first communication portion that communicates between the injection portion and the first space, and a second communication portion that communicates between the injection portion and the second space are provided between the inner wall surface and one of long sides of the permanent magnet. In addition, the first communication portion and the second communication portion are configured to have the same length.

According to another aspect of the present application, a rotary electric machine rotor includes a rotor core having rectangular permanent magnets secured in magnet insertion holes with a bonding component. The rotor includes a first space and a second space are provided around each of the permanent magnets so as to be located between both ends in a longer-side direction of the permanent magnet and an inner wall surface defining each of the magnet insertion holes. The injection portion is located so that a flow rate at which the bonding component flows into the first space through the first communication portion is equal to a flow rate at which the bonding component flows into the second space through the second communication portion.

According to still another aspect of the present application, a rotary electric machine rotor includes a rotor core, a permanent magnet, and a bonding component. The rotor core has a rotational axis and includes a magnet insertion hole which is defined by an inner wall. The permanent magnet is inserted into the magnet insertion hole and has a polygonal shape viewed along the rotational axis. The polygonal shape includes a first side, a second side, and a third side. The second side is opposite to the first side. The third side connects the first side and the second side. The bonding component is disposed between the permanent magnet and the inner wall to bond the permanent magnet and the inner wall. The magnet insertion hole includes a first space, a second space, an injection portion, a first communication portion, and a second communication portion. The first space is provided between the first side and the inner wall viewed along the rotational axis. The second space is provided between the second side and the inner wall viewed along the rotational axis. The injection portion is provided between the third side and the inner wall viewed along the rotational axis. The bonding component is injected through the injection portion. The first communication portion is provided between the third side and the inner wall viewed along the rotational axis to connect the injection portion and the first space. The first communication portion has a first length along the third side. The second communication portion is provided between the third side and the inner wall viewed along the rotational axis to connect the injection portion and the second space. The second communication portion has a second length along the third side which is equal to the first length.

According to the other aspect of the present application, a rotary electric machine rotor includes a rotor core, a permanent magnet, and a bonding component. The rotor core has a rotational axis and includes a magnet insertion hole which is defined by an inner wall. The permanent magnet is inserted into the magnet insertion hole and has a polygonal shape viewed along the rotational axis. The polygonal shape includes a first side, a second side, and a third side. The second side is opposite to the first side. The third side connects the first side and the second side. The bonding component is disposed between the permanent magnet and the inner wall to bond the permanent magnet and the inner wall. The magnet insertion hole includes a first space, a second space, an injection portion, a first communication portion, and a second communication portion. The first space is provided between the first side and inner wall viewed along the rotational axis. The second space is provided between the second side and the inner wall viewed along the rotational axis. The injection portion is provided between the third side and the inner wall viewed along the rotational axis. The bonding component is injected through the injection portion. The first communication portion connects the injection portion and the first space such that the bonding component flows into the first space through the first communication portion at a first flow rate. The second communication portion connects the injection portion and the second space such that the bonding component flows into the second space through the second communication portion at a second flow rate which is equal to the first flow rate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
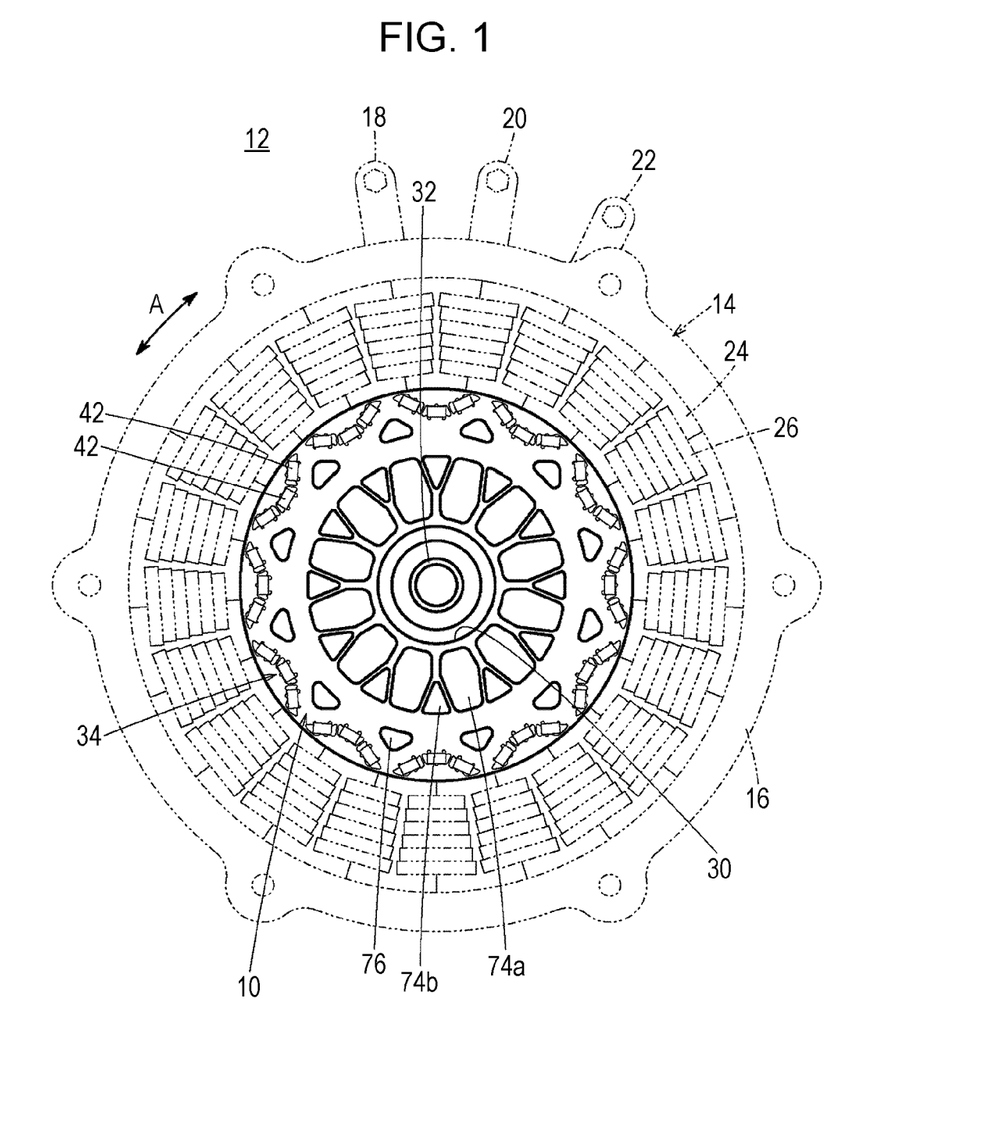
FIG. 1 is a front view of a rotary electric machine that uses a rotor according to an embodiment of the present application.

FIG. 1 shows a schematic view of a rotary electric machine 12 that uses a rotor 10 according to an embodiment of the present application. The rotary electric machine 12 is, for example, a three-phase AC brushless motor.

The rotary electric machine 12 has an annular-shaped stator 14. A rotor 10 is inserted into a center of the stator 14 so as to be rotatable. The stator 14 has an annular-shaped housing 16 provided on an outer circumference thereof. In the rotary electric machine 12, the rotor 10 is operated on electric power supplied from a power source (not illustrated) through a U-phase terminal 18, a V-phase terminal 20, and a W-phase terminal 22.

The stator 14 has split cores in which, for example, a plurality of steel plates are stacked in an axial direction and are split in a circumferential direction (indicated by an arrow "A" in the figure). The stator 14 includes an annular-shaped stator core 24 and a plurality of conductors 26 that are mounted in slots (not illustrated) provided on the stator core 24. The conductors 26 are connected to the U-phase terminal 18, the V-phase terminal 20, and the W-phase terminal 22. The stator core 24 may be formed in an integrated manner, instead of a plurality of split cores combined.

Figure 2:
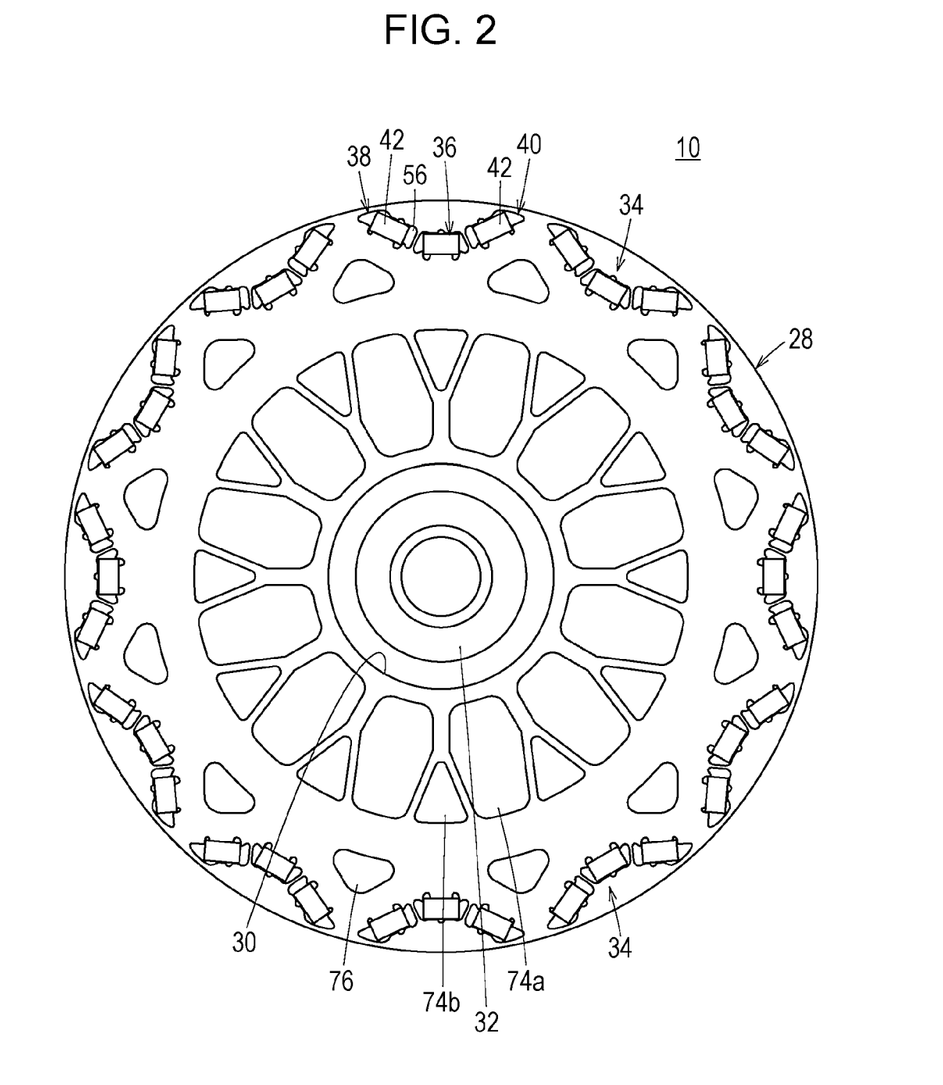
FIG. 2 is a front view of the rotor.

As shown in FIGS. 1 and 2, the rotor 10 includes a disk-shaped rotor core 28 and a rotating shaft 32 that is press-fitted to a hole 30 formed at the center of the rotor core 28. The rotor core 28 is formed by stacking, for example, a plurality of disk-shaped steel plates in the axial direction.

Figure 3:
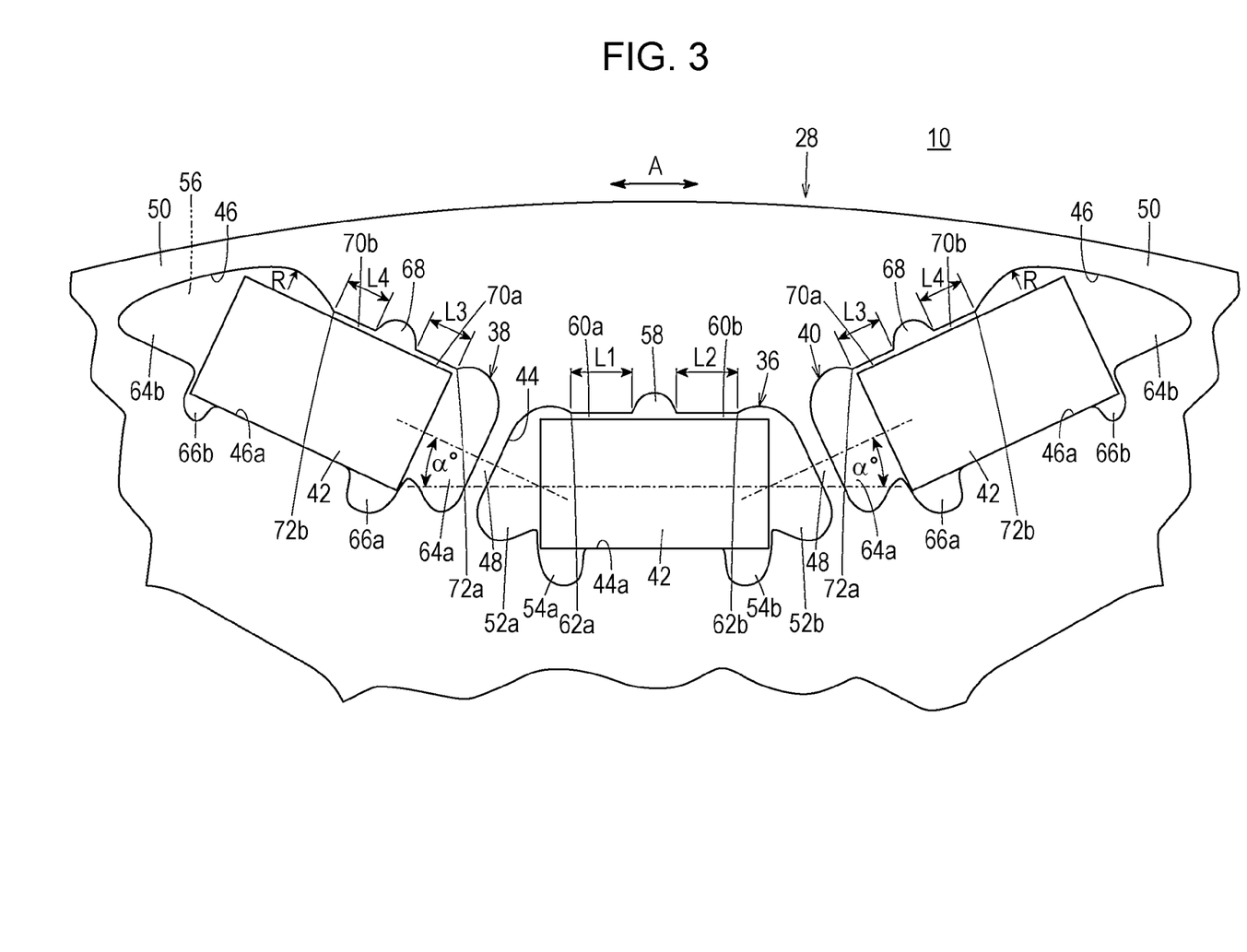
FIG. 3 is an enlarged front view of part of a rotor core constituting the rotor.

The rotor core 28 has a plurality of or, for example, twelve magnet insertion portions 34 spaced away from each other at equal angles on an outer circumferential edge thereof. As shown in FIGS. 2 and 3, each of the magnet insertion portions 34 has a first magnet insertion hole 36, a second magnet insertion hole 38, and a third magnet insertion hole 40, the first magnet insertion hole 36 being provided between the second and third magnet insertion holes 38, 40. Each of the first magnet insertion hole 36, the second magnet insertion hole 38, and the third magnet insertion hole 40 has a rectangular permanent magnet 42 secured thereto with a bonding component 56.

As shown in FIG. 3, the first magnet insertion hole 36 is disposed parallel to a tangent line of the rotor core 28. Each of the second magnet insertion hole 38 and the third magnet insertion hole 40 is disposed so as to be inclined at an angle of $\alpha$ toward the outside of the rotor core 28 (in the direction opposite to the direction of the center) relative to the first magnet insertion hole 36.

The first magnet insertion hole 36 is defined by an inner wall surface 44, while each of the second magnet insertion hole 38 and the third magnet insertion hole 40 is defined by an inner wall surface 46. A first rib 48 having a substantially constant width is formed between both ends in a longer-side direction of the inner wall surface 44 and one end in the longer-side direction of the inner wall surface 46. In addition, a second rib 50 having a substantially constant width is formed between the other end of the inner wall surface 46 and an outer circumferential end of the rotor core 28.

The inner wall surface 44 that defines the first magnet insertion hole 36 has a supporting surface 44a, while the inner wall surface 46 that defines the second magnet insertion hole 38 and the third magnet insertion hole 40 has a supporting surface 46a with which the permanent magnet 42 is in contact. The supporting surfaces 44a, 46a are inner ends of the inner wall surfaces 44, 46.

The first magnet insertion hole 36 has a first space 52a and a second space 52b which are provided around the permanent magnet 42 so as to be located between both ends in the longer-side direction of the permanent magnet 42 and the inner wall surface 44 defining the first magnet insertion hole 36. The first space 52a and the second space 52b have the same shape and expand outward toward an inner side of the rotor core 28. The supporting surface 44a is provided with curved expansion portions 54a, 54b (recessed portions) that are located at both ends in the longer-side direction of the permanent magnet 42. The curved expansion portions 54a, 54b have the same shape.

An injection portion 58 through which the bonding component (for example, epoxy resin) 56 is injected is provided in the first magnet insertion hole 36 between the inner wall surface 44 and one of the long sides of the permanent magnet 42. Specifically, the injection portion 58 is formed in the inner wall surface 44 of the first magnet insertion hole 36 on the outer side in the axial direction of the rotor core 28 in such a manner as to be recessed in a semicircular shape when viewed in section.

The first magnet insertion hole 36 has a first communication portion 60a that communicates between the injection portion 58 and the first space 52a and a second communication portion 60b that communicates between the injection portion 58 and the second space 52b. In this embodiment, a length L1 of the first communication portion 60a is configured to be equal to a length L2 of the second communication portion 60b (length L1=length L2).

In addition, in this embodiment, the injection portion 58 is located so that a flow rate at which the bonding component 56 flows into the first space 52a through the first communication portion 60a is equal to a flow rate at which the bonding component 56 flows into the second space 52b through the second communication portion 60b, in which the length L1 may not be equal to the length L2.

The first magnet insertion hole 36 has a first restricting portion 62a that restricts an opening width in a shorter-side direction of the permanent magnet 42 to a greater degree at a position thereof closer to the injection portion 58 than at the first space 52a. The first magnet insertion hole 36 also has a second restricting portion 62b that restricts an opening width in a shorter-side direction of the permanent magnet 42 to a greater degree at a position thereof closer to the injection portion 58 than at the second space 52b. The first restricting portion 62a is in communication with the first communication portion 60a, while the second restricting portion 62b is in communication with the second communication portion 60b.

The second magnet insertion hole 38 has a first space 64a and a second space 64b which are provided around the permanent magnet 42 so as to be located between both ends in the longer-side direction of the permanent magnet 42 and the inner wall surface 46 defining the second magnet insertion hole 38. The first space 64a and the second space 64b have different shapes and opening areas. The supporting surface 46a is provided with curved expansion portions 66a, 66b (recessed portions) that are located at both ends in the longer-side direction of the permanent magnet 42. The curved expansion portion 66a and the curved expansion portion 66b have different opening areas.

An injection portion 68 through which the bonding component 56 is injected is provided in the second magnet insertion hole 38 between the inner wall surface 46 and one of long sides of the permanent magnet 42. Specifically, the injection portion 68 is formed in the inner wall surface 46 of the second magnet insertion hole 38 on the outer side in the radial direction of the rotor core 28 in such a manner as to be recessed in a semicircular shape when viewed in section.

The second magnet insertion hole 38 has a first communication portion 70a that communicates between the injection portion 68 and the first space 64a and a second communication portion 70b that communicates between the injection portion 68 and the second space 64b. In this embodiment, a length L3 of the first communication portion 70a is equal to a length L4 of the second communication portion 70b (length L3=length L4).

In addition, in this embodiment, the injection portion 68 is located so that a flow rate at which the bonding component 56 flows into the first space 64a through the first communication portion 70a is equal to a flow rate at which the bonding component 56 flows into the second space 64b through the second communication portion 70b, in which the length L3 may not be equal to the length L4.

The second magnet insertion hole 38 has a first restricting portion 72a that restricts an opening width in a shorter-side direction of the permanent magnet 42 to a greater degree at a position thereof closer to the injection portion 68 than at the first space 64a. The second magnet insertion hole 38 also has a second restricting portion 72b that restricts an opening width in a shorter-side direction of the permanent magnet 42 to a greater degree at a position thereof closer to the injection portion 68 than at the second space 64b. The first restricting portion 72a is in communication with the first communication portion 70a, while the second restricting portion 72b is in communication with the second communication portion 70b.

The third magnet insertion hole 40 is the same as the second magnet insertion hole 38. The same reference numerals and symbols refer to the same components, and repeated descriptions of the same components are omitted.

As shown in FIG. 2, the rotor core 28 has a plurality of lightening holes 74a, 74b alternately arranged in an annular shape around the hole 30 thereof. In addition, the rotor core 28 has a plurality of lightening holes 76 arranged around the lightening holes 74a, 74b.

Next, the operation of the rotor 10 will be described in association with the rotary electric machine 12.

As shown in FIG. 1, if electric power is supplied to the U-phase terminal 18, the V-phase terminal 20, and the W-phase terminal 22 from the power source (not illustrated), the conductors 26 are energized. The conductors 26, after being energized, are excited, thereby generating a rotating magnetic field which causes the rotor 10 provided with the permanent magnet 42 as a magnetic pole to start rotational movement inside the stator 14.

As shown in FIG. 3, in this embodiment, the second magnet insertion hole 38 has the first space 64a and the second space 64b located around the permanent magnet 42. In addition, the second magnet insertion hole 38 has the first communication portion 70a that communicates between the injection portion 68 and the first space 64a and the second communication portion 70b that communicates between the injection portion 68 and the second space 64b. Furthermore, the length L3 of the first communication portion 70a is configured to be equal to the length L4 of the second communication portion 70b (length L3=length L4).

Figure 4:
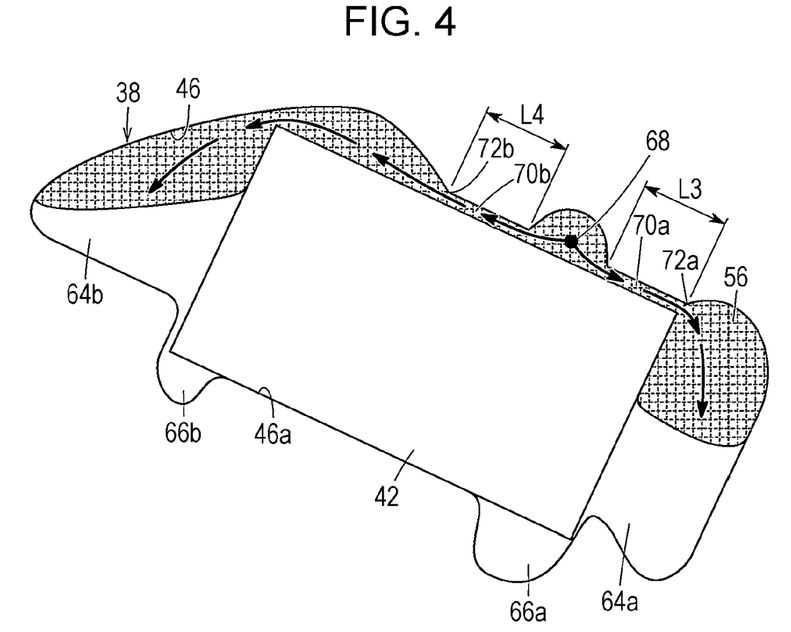
FIG. 4 is an explanatory diagram of a second magnet insertion hole constituting the rotor core that is being charged with a bonding component.

With this arrangement, as shown in FIG. 4, the bonding component 56 injected into the injection portion 68 is equally introduced into the first space 64a and the second space 64b through the first communication portion 70a and the second communication portion 70b.

Figure 5:
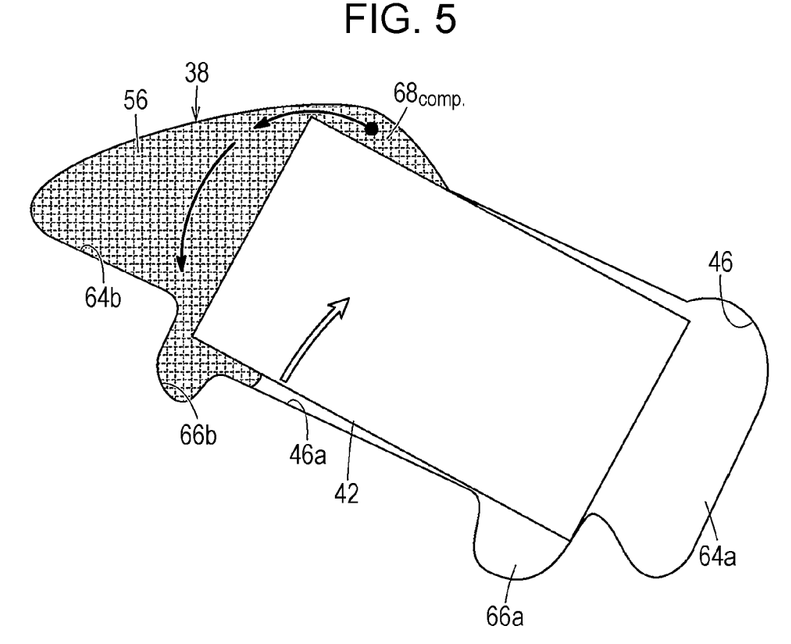
FIG. 5 is an explanatory diagram of the second magnet insertion hole that is being charged with a bonding component that is given for a comparison purpose.

On the contrary, as shown in FIG. 5, in a configuration where the injection portion $68_{comp.}$ is located close to the second space 64b, the bonding component 56 injected into the injection portion $68_{comp.}$ is preferentially introduced into the second space 64b. As a result, the permanent magnet 42 in the second magnet insertion hole 38 is subjected to a pressing force coming from one of short sides thereof, which is likely to cause the permanent magnet 42 to be inclined.

In this present application, as shown in FIG. 4, the bonding component 56 is prevented from preferentially flowing into the first space 64a or the second space 64b, thereby preventing a biased flow of the bonding component 56 and an inclination of the permanent magnet 42. This ensures that the permanent magnet 42 is secured in the second magnet insertion hole 38 with ease and precision as well as reduces an inclination of the permanent magnet 42 as much as possible.

In particular, even in the case of the second magnet insertion hole 38 in which the first space 64a and the second space 64b are configured to have different opening areas, the permanent magnet 42 does not become inclined. This ensures that the permanent magnet 42 comes into contact with the supporting surface 46a with precision.

In this present application, as shown in FIG. 4, the injection portion 68 is located so that a flow rate at which the bonding component 56 flows into the first space 64a through the first communication portion 70a is equal to a flow rate at which the bonding component 56 flows into the second space 64b through the second communication portion 70b. Accordingly, the bonding component 56 injected into the injection portion 68 is introduced into the first space 64a and the second space 64b through the first communication portion 70a and the second communication portion 70b at the same flow rate.

With this arrangement, the bonding component 56 is prevented from preferentially flowing into the first space 64a or the second space 64b, thereby preventing a biased flow of the bonding component 56 and an inclination of the permanent magnet 42. This ensures that the permanent magnet 42 is secured in the second magnet insertion hole 38 with ease and precision as well as reduces an inclination of the permanent magnet 42 as much as possible.

In particular, even in the case of the second magnet insertion hole 38 in which the first space 64a and the second space 64b are configured to have different opening areas, the permanent magnet 42 does not become inclined. This ensures that the permanent magnet 42 accurately comes into contact with the supporting surface 46a.

In addition, as shown in FIG. 3, the second magnet insertion hole 38 has the second restricting portion 72b that restricts an opening width in the shorter-side direction of the permanent magnet 42 to a greater degree at a position thereof closer to the injection portion 68 than at the second space 64b, which enables the second rib 50 to be thinned and curved. This enables stress to be dispersed in a preferred manner and allows magnetic flux saturation to be more easily triggered whereby a short circuit can be prevented.

Furthermore, the supporting surface 46a in the second magnet insertion hole 38 is provided with curved expansion portions 66a, 66b that are located respectively at both ends in the longer-side direction of the permanent magnet 42. With this arrangement, when the permanent magnet 42 is swollen at low temperatures, stress concentration in the inner wall surface 46 can be prevented without fail whereby damage to the rotor core 28 can be prevented. The curved expansion portions 66a, 66b have different opening areas. The difference in stiffness between the right and left portions is intended to prevent stress concentration.

In the second magnet insertion hole 38, the injection portion 68 is formed in the inner wall surface 46 of the second insertion hole 38 on the outer side in the radial direction of the rotor core 28 in such a manner as to be recessed in a semicircular shape. With this arrangement, a centrifugal force of the permanent magnet 42 can be transmitted to each of the steel plates constituting the rotor core 28 via the bonding component 56 made of resin.

In this embodiment, only the second magnet insertion hole 38 is described in terms of the effect. The third magnet insertion hole 40 and the first magnet insertion hole 36 also produce the same effect as the second magnet insertion hole 38.

A first aspect of the present application provides a rotary electric machine which includes a rotor core having rectangular permanent magnets secured with bonding components to magnet insertion holes in which a first space and a second space are provided around each of the permanent magnets so as to be located between both ends in a longer-side direction of the permanent magnet and an inner wall surface defining each of the magnet insertion holes.

An injection portion through which each of the bonding components is injected, a first communication portion that communicates between the injection portion and the first space, and a second communication portion that communicates between the injection portion and the second space are provided between the inner wall surface and one of long sides of the permanent magnet. In addition, the first communication portion and the second communication portion are configured to have the same length. With this arrangement, the bonding component injected into the injection portion is equally introduced into the first space and the second space through the first communication portion and the second communication portion. Accordingly, the bonding component can be prevented from preferentially flowing into the first space or the second space, thereby preventing a biased flow of the bonding component and an inclination of the permanent magnet. This ensures that the permanent magnet is secured in the magnet insertion hole with ease and precision as well as reduces inclination of the permanent magnet as much as possible.

A second aspect of the present application provides a rotary electric machine in which the injection portion is located so that a flow rate at which the bonding component flows into the first space through the first communication portion is equal to a flow rate at which the bonding component flows into the second space through the second communication portion. With this arrangement, the bonding component injected into the injection portion is introduced into the first space and the second space through the first communication portion and the second communication portion at the same flow rate. Accordingly, the bonding component can be prevented from preferentially flowing into the first space or the second space, thereby preventing a biased flow of the bonding component and inclination of the permanent magnet. This ensures that the permanent magnet is secured in the magnet insertion hole with ease and precision as well as reduces inclination of the permanent magnet as much as possible.

A third aspect of the present application provides the rotary electric machine in which, preferably, the injection portion is provided in the magnet insertion hole on an outer side in an axial direction of the rotor core.

A fourth aspect of the present application provides the rotary electric machine in which, preferably, the first magnet insertion hole has a first restricting portion that restricts an opening width in a shorter-side direction of the permanent magnet to a greater degree at a position thereof closer to the injection portion than at the first space and a second restricting portion that restricts an opening width in a shorter-side direction of the permanent magnet to a greater degree at a position thereof closer to the injection portion than at the second space. In addition, preferably, the first restricting portion is in communication with the first communication portion, while the second restricting portion is in communication with the second communication portion.

Obviously, numerous modifications and variations of the present invention are possible in light of the above teachings. It is therefore to be understood that within the scope of the appended claims, the invention may be practiced otherwise than as specifically described herein.

What is claimed is:

1. A rotary electric machine rotor that includes a rotor core having rectangular permanent magnets secured in magnet insertion holes with a bonding component, the rotor comprising:
a first space and a second space which are provided around each of the permanent magnets so as to be located between both ends in a longer-side direction of the permanent magnet and an inner wall surface defining each of the magnet insertion holes;
an injection portion through which the bonding component is injected;

a first communication portion that communicates between the injection portion and the first space; and a second communication portion that communicates between the injection portion and the second space, all of the injection portion, the first communication portion, and the second communication portion being provided between the inner wall surface and one of long sides of the permanent magnet, wherein the first communication portion and the second communication portion have the same length.

2. A rotary electric machine rotor that includes a rotor core having rectangular permanent magnets secured in magnet insertion holes with a bonding component, the rotor comprising:

a first space and a second space which are provided around each of the permanent magnets so as to be located between both ends in a longer-side direction of the permanent magnet and an inner wall surface defining each of the magnet insertion holes;

an injection portion through which the bonding component is injected, the injection portion being provided between the inner wall surface and one of long sides of the permanent magnet;

a first communication portion that communicates between the injection portion and the first space; and a second communication portion that communicates between the injection portion and the second space, wherein the injection portion is located so that a flow rate at which the bonding component flows into the first space through the first communication portion is equal to a flow rate at which the bonding component flows into the second space through the second communication portion.

3. The rotary electric machine rotor according to claim 1, wherein the injection portion is provided in the magnet insertion hole on an outer side in a radical direction of the rotor core.

4. The rotary electric machine rotor according to claim 1, wherein the first magnet insertion hole has a first restricting portion that restricts an opening width in a shorter-side direction of the permanent magnet to a greater degree at a position thereof closer to the injection portion than at the first space and a second restricting portion that restricts an opening width in a shorter-side direction of the permanent magnet to a greater degree at a position thereof closer to the injection portion than at the second space; and wherein the first restricting portion is in communication with the first communication portion, while the second restricting portion is in communication with the second communication portion.

5. A rotary electric machine rotor comprising:

a rotor core having a rotational axis and including a magnet insertion hole which is defined by an inner wall;

a permanent magnet inserted into the magnet insertion hole and having a polygonal shape viewed along the rotational axis, the polygonal shape comprising:
a first side;
a second side opposite to the first side; and
a third side connecting the first side and the second side;

a bonding component disposed between the permanent magnet and the inner wall to bond the permanent magnet and the inner wall; and the magnet insertion hole comprising:

a first space provided between the first side and the inner wall viewed along the rotational axis;

a second space provided between the second side and the inner wall viewed along the rotational axis;

an injection portion which is provided between the third side and the inner wall viewed along the rotational axis and through which the bonding component is injected;

a first communication portion provided between the third side and the inner wall viewed along the rotational axis to connect the injection portion and the first space, the first communication portion having a first length along the third side; and a second communication portion provided between the third side and the inner wall viewed along the rotational axis to connect the injection portion and the second space, the second communication portion having a second length along the third side which is equal to the first length.

6. A rotary electric machine rotor comprising:

a rotor core having a rotational axis and including a magnet insertion hole which is defined by an inner wall;

a permanent magnet inserted into the magnet insertion hole and having a polygonal shape viewed along the rotational axis, the polygonal shape comprising:
a first side;
a second side opposite to the first side; and
a third side connecting the first side and the second side;

a bonding component disposed between the permanent magnet and the inner wall to bond the permanent magnet and the inner wall; and the magnet insertion hole comprising:

a first space provided between the first side and inner wall viewed along the rotational axis;

a second space provided between the second side and the inner wall viewed along the rotational axis;

an injection portion which is provided between the third side and the inner wall viewed along the rotational axis and through which the bonding component is injected;

a first communication portion connecting the injection portion and the first space such that the bonding component flows into the first space through the first communication portion at a first flow rate; and a second communication portion connecting the injection portion and the second space such that the bonding component flows into the second space through the second communication portion at a second flow rate which is equal to the first flow rate.

7. The rotary electric machine rotor according to claim 5, wherein the polygonal shape further has a fourth side opposite to the third side and the third side is an outer side with respect to the fourth side in a radical direction of the rotor core.

8. The rotary electric machine rotor according to claim 5, wherein the first magnet insertion hole has a first restricting portion that restricts an opening width along the first side to a greater degree at a position thereof closer to the injection portion than at the first space and a second restricting portion that restricts an opening width along the second side to a greater degree at a position thereof closer to the injection portion than at the second space; and wherein the first restricting portion is in communication with the first communication portion, while the second restricting portion is in communication with the second communication portion.

9. The rotary electric machine rotor according to claim 5, wherein
the polygonal shape is a rectangular shape.

10. The rotary electric machine rotor according to claim 6, wherein
the polygonal shape is a rectangular shape.

11. The rotary electric machine rotor according to claim 9, wherein
the first side and the second side are shorter than the third side.

12. The rotary electric machine rotor according to claim 10, wherein
the first side and the second side are shorter than the third side.

\* \* \* \* \*